(12) United States Patent
Fukui

(10) Patent No.: US 7,773,474 B2
(45) Date of Patent: Aug. 10, 2010

(54) DISC APPARATUS

(75) Inventor: Toshiaki Fukui, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 396 days.

(21) Appl. No.: 12/022,579

(22) Filed: Jan. 30, 2008

(65) Prior Publication Data

US 2008/0192601 A1 Aug. 14, 2008

(30) Foreign Application Priority Data

Jan. 31, 2007 (JP) ............................. 2007-020379

(51) Int. Cl.
G11B 7/00 (2006.01)
(52) U.S. Cl. ................. 369/53.18; 369/30.03; 369/59.1
(58) Field of Classification Search ............... 369/53.18
See application file for complete search history.

(56) References Cited

U.S. PATENT DOCUMENTS

2006/0062093 A1* 3/2006 Guo ........................ 369/30.03
2008/0192601 A1* 8/2008 Fukui ....................... 369/53.18

FOREIGN PATENT DOCUMENTS

JP 5-342779 A 12/1993
JP 2002-352447 A 12/2002

* cited by examiner

Primary Examiner—Van N Chow
(74) Attorney, Agent, or Firm—Crowell & Moring LLP

(57) ABSTRACT

A disc apparatus which enables an optical pickup to move swiftly to a target track is provided.

A disc apparatus (1) includes an optical pickup (4) which irradiates an optical disc (2) with a laser light, a motor (6) which moves the optical pickup (4) to a target track in a radial direction of the optical disc (2), and a controller (7) which controls the motor (6). The controller 7 includes a calculating means (7a) which calculates a voltage level applied to the motor (6) and a recording unit (7b) which records a reference voltage level, a corrected number of tracks, and a coefficient. The calculating means (7a) calculates a voltage level based on the number of tracks between a track which the optical pickup is positioned over and the target track, the reference voltage level, the corrected number of tracks, and the coefficient. The controller (7) moves the optical pickup (4) widely to a position close to the target track by driving the motor (6) at the voltage level which is calculated by the calculating means (7a). Consequently, the controller (7) can move the optical pickup (4) to the target track swiftly.

3 Claims, 7 Drawing Sheets

DISC APPARATUS

BACKGROUND OF THE INVENTION

1. Field of the Invention

The present invention relates to a disc apparatus which perform a seek operation to move an optical pickup.

2. Description of the Related Art

A disc apparatus records and reproduces data by irradiating an optical disc such as CD and DVD, on which tracks are concentrically or spirally formed to record the data, with a laser light from an optical pickup. A seek operation of the disc apparatus to move the optical pickup in a radial direction of the optical pickup enables the recording and reproduction of the data in a predetermined position of the optical disc. The seek operation which is performed before the disc apparatus records and reproduces the data is conventionally performed by moving the optical pickup to the predetermined position with counting the number of tracks. It is preferable that the seek operation is performed swiftly to shorten a waiting time for a user.

For this reason, as shown in Japanese Laid-Open Patent Publication No. 2002-352447, for example, there is a known technique that an accumulated seek distance of an optical pickup is recorded so that a seek operation is controlled in accordance with the accumulated seek distance to resolve a trouble that a time for the seek operation becomes long due to an abrasion of the disc apparatus. Moreover, as shown in Japanese Laid-Open Patent Publication No. 5-342779, there is a known technique that an optical pickup is stably moved by correcting a difference between position signals which are obtained in an outer circumference and an inner circumference of an optical disc so as to prevent the time for a seek operation from being prolonged.

However, the technique of the Patent Publication No. 2002-352447 is to resolve the problem that the time for the seek operation becomes long in accordance with the accumulated seek distance of the optical pickup, and thereby it does not shorten the time for the seek operation of the optical pickup itself. Moreover, the technique of the Patent Publication 5-342779 is to correct the difference between the position signals which are obtained in the outer circumference and the inner circumference of the optical disk, and thereby it does not enable the optical pickup to move swiftly to the predetermined position regardless of the position of the optical disc.

An object of the present invention is to provide a disc apparatus which calculates a voltage level based on the number of tracks on an optical disc which an optical pickup moves over and enables the optical pickup to move swiftly and accurately to a predetermined position by driving a motor at the voltage level.

SUMMARY OF THE INVENTION

The above object of the present invention is to provide a disc apparatus which includes an optical pickup which irradiate an optical disc with a laser light to record and reproduce data, a motor which moves the optical pickup in a radial direction of the optical disc in accordance with an applied voltage level, and a controller which controls the optical pickup and the motor, wherein the controller further includes a recording unit which records a predetermined reference voltage level and a coefficient and a calculating means which calculates a voltage level so that a seek operation is performed by driving the motor to move the optical pick up to a target track or a position close to the target track, and when a targeted number of tracks between a start position track which the optical pickup is positioned over at start of the seek operation and the target track is equal to or larger than a predetermined threshold level, the calculating means calculates a voltage adjusted level based on a remaining number of tracks between a current position track which the optical pickup is positioned over and the target track, the coefficient, and the targeted number of tracks; calculates the voltage level based on the voltage adjusted level and the reference voltage level; and makes the recording unit record the voltage level as the reference voltage level, the motor moves the optical pickup in accordance with the voltage level, and the controller performs the seek operation repeatedly until the remaining number of tracks becomes smaller than the threshold level.

According to the above configuration, when the targeted number of tracks is equal to or larger than the predetermined threshold level, the calculating means calculates the voltage level based on the predetermined coefficient, the remaining number of tracks, and the targeted number of tracks, and the controller makes the calculating means calculate the voltage level until the remaining number of tracks becomes smaller than the threshold level, and then performs the seek operation to move the optical pickup repeatedly by driving the motor at that voltage level. Consequently, the disc apparatus enables the optical pickup to move swiftly to the desired track.

It is preferable that the recording unit records the predetermined level corresponding to the remaining number of tracks and at least two coefficients, and the calculating means determines one coefficient from the coefficients which are recorded by the recording unit depending on whether the remaining number of tracks is larger than the predetermined level or not, and calculates a value obtained by multiplying the remaining number of tracks by the coefficient and subsequently dividing by the targeted number of tracks as the voltage adjusted level.

According to the above configuration, the calculating means changes the coefficient depending on whether the remaining number of tracks is larger than the predetermined level or not, and calculates the value obtained by multiplying the remaining number of tracks by the coefficient and subsequently dividing by the targeted number of tracks as the voltage level. Consequently, the disc apparatus enables the motor to drive at the voltage level in accordance with the targeted number of tracks.

It is more preferable that the recording unit records a predetermined corrected number of tracks, and the calculating means calculates the voltage adjusted level by multiplying a difference between the remaining number of tracks and the corrected number of tracks by the coefficient and subsequently dividing by the targeted number of tracks, and subsequently calculates a sum of the voltage adjusted level and the reference voltage level as the voltage level.

According to the above configuration, when the targeted number of tracks is equal to or larger than the predetermined threshold level, the calculating means calculates the voltage level based on the predetermined corrected number of tracks, the predetermined coefficient, the remaining number of tracks between the position which the optical pickup is positioned over and the target track, and the targeted number of tracks, and the controller makes the calculating means calculate the voltage level until the remaining number of tracks becomes smaller than the threshold level, and then performs the seek operation to move the optical pickup repeatedly by driving the motor at that voltage level. Consequently, the disc apparatus enables the optical pickup to move swiftly to the desired track compared to the conventional seek operation that the optical pickup is moved with counting the number of tracks.

BRIEF DESCRIPTION OF THE DRAWINGS

The present invention will be described below with reference to the annexed drawings. It is to be noted that all the drawings are shown for the purpose of illustrating the technical concept of the present invention or embodiments thereof, wherein.

DESCRIPTION OF THE PREFERRED EMBODIMENTS

Figure 1:
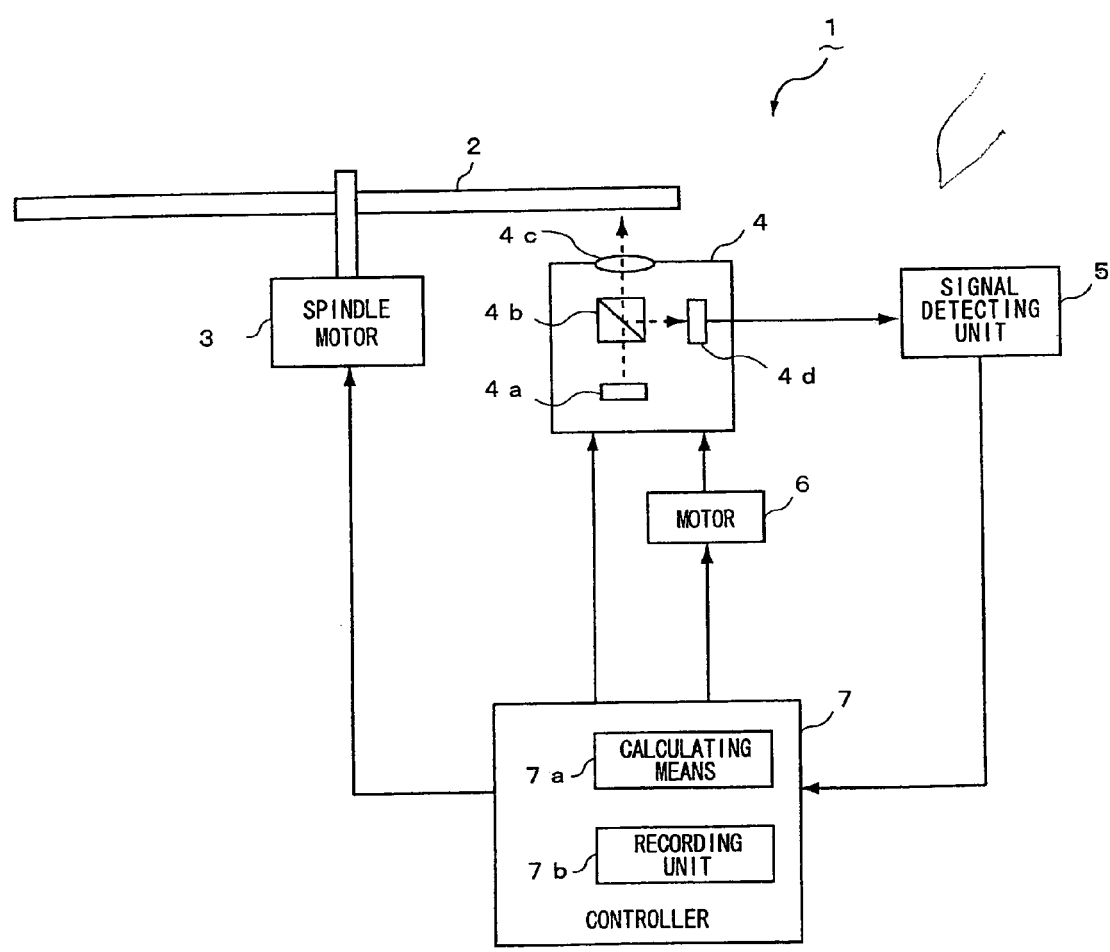
FIG. 1 is a schematic diagram of a disc apparatus according to first and second preferred embodiments of the present invention.

A disc apparatus according to preferred embodiments of the present invention is described below with reference to FIGS. 1 to 7. FIG. 1 shows a schematic configuration of the disc apparatus according to the first and second preferred embodiments of the present invention. A disc apparatus 1 includes a spindle motor 3 which rotates an optical disc 2, an optical pickup 4 which irradiates the optical disc 2 with a laser light, a signal detecting unit 5 which detects reproduction signals and track signals relating to tracks on the optical disc 2 from a reflected light which is reflected by the optical disc 2, a motor 6 which moves the optical pickup 4 in a radial direction of the optical disc 2, a controller 7 which controls the spindle motor 3, the optical pickup 4, and the motor 6. The optical disc 2 is CD or DVD, for example, and the motor 6 is a linear motor, for example.

The optical pickup 4 includes a semiconductor laser 4a which irradiates the optical disc 2 with a laser light under control of the controller 7, a beam splitter 4b which passes the laser light which is outputted from the semiconductor laser 4a, an objective lens 4c which gathers the laser light which passes through the beam splitter 4b on the optical disc 2, and a photo detector 4d which receives the reflected light from the optical disc 2 whose direction is changed by the beams splitter 4b and outputs signals to the signal detecting unit 5. The controller 7 includes a calculating means 7a which calculates a voltage level applied to the motor 6 and a recording unit 7b which records a predetermined reference voltage level, corrected number of tracks, and coefficient which are used when the calculating means 7a calculates the voltage level 7a.

The controller 7 performs a seek operation to move the optical pickup 4 to a predetermined track on the optical disc 2 before making the optical pickup 4 record and reproduce data. The seek operation indicates a rough seek operation that the controller 7 moves the optical pickup 4 to a position close to the predetermined track widely and a precise seek operation that the controller 7 moves the optical pickup 4 to the predetermined track minutely, and the present invention relates to the rough seek operation. In the rough seek operation, the calculating means 7a calculates the voltage level based on the reference voltage level and the coefficient which are recorded by the recording unit 7b and the track signals which are detected by the signal detecting unit 5, and the motor 6 moves the optical pickup 4 in accordance with the voltage level calculated by the calculating means 7a. In contrast, the precise seek operation is a method which is used in the conventional disc apparatus 1, and the controller 7 moves the optical pickup 4 to the target track with counting the number of tracks.

The rough seek operation enables the optical pickup 4 to move swiftly compared to the precise seek operation, however, it does not sometimes enable the optical pickup 4 to stop over the predetermined track accurately. In contrast, the precise seek operation does not enable the optical pickup 4 to move swiftly compared to the rough seek operation, however, it enables the optical pickup 4 to stop over the predetermined track accurately. The controller 7 thereby performs a seek operation processing that the optical pickup 4 is moved to the predetermined track by the precise seek operation after the optical pickup 4 is moved to the position close to the predetermined track by the rough seek operation. Consequently, the disc apparatus 1 enables the optical pickup 4 to move to the predetermined track in a short time compared to the method that the optical pickup 4 is moved to the predetermined track only by the conventional precise seek operation.

Figure 2:
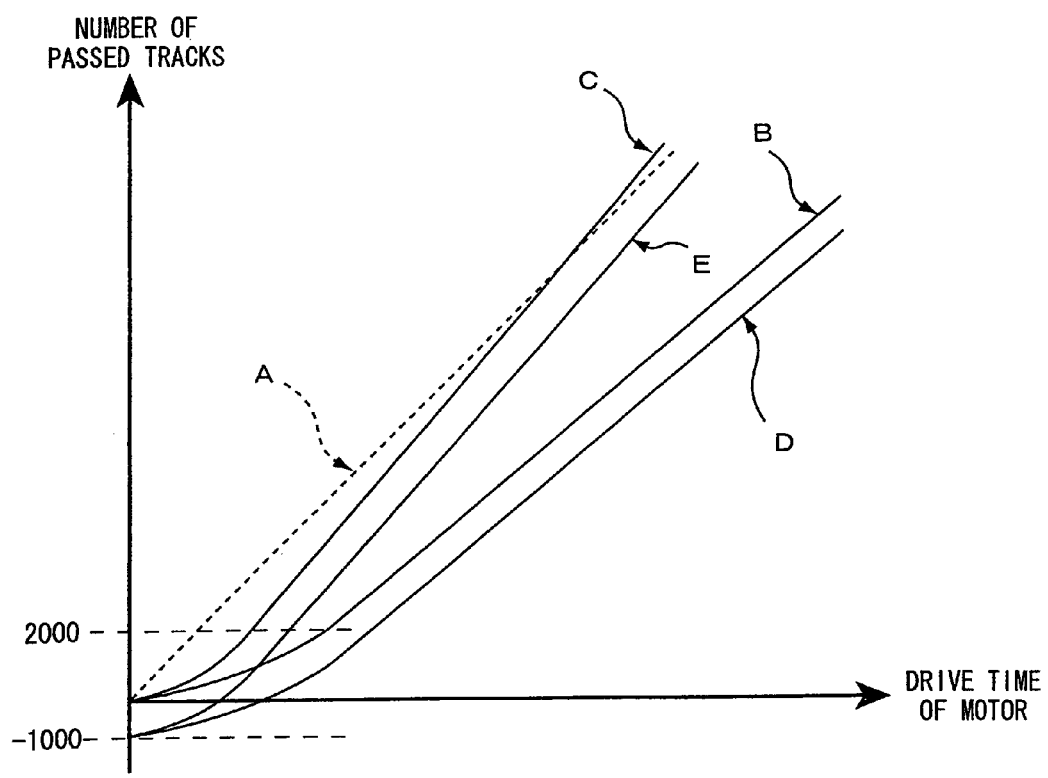
FIG. 2 is a diagram showing a relationship between number of passed tracks which an optical pickup moves over and a time according to the first and second preferred embodiments of the present invention.

FIG. 2 shows the relationship between the number of passed tracks which the optical pickup 4 moves over and the time according to the first and second preferred embodiments of the present invention. In FIG. 2, a horizontal axis indicates the drive time of the motor 6 to which the certain voltage is applied, and a vertical axis indicates the number of passed tracks which the optical pickup 4, which is moved by the motor 6, moves over. A characteristic line A which is indicated by a dashed line is an ideal characteristic line of the drive time of the motor 6 and the number of passed tracks which the optical pickup moves over in an ideal condition that there is no load resulting from the motor 6 driving and load resulting from the optical pickup 4 moving. However, a characteristic of the actual drive time and the number of passed tracks in the disc apparatus 1 is not indicated by the ideal characteristic line A but a characteristic line B which is indicated by a continuous line. In the actual characteristic line B, there is the load resulting from the motor 6 driving and the load resulting from the optical pickup 4 moving, so that even when the motor 6 starts driving, the number of passed tracks does not increase immediately. The actual characteristic line B has a proportional relationship that when the number of passed tracks increases to reach more than 2000, the number of passed tracks increases in accordance with the increase of the drive time.

After the number of passed tracks increases to reach more than 2000, a slope of the actual characteristic line B may be different from that of the ideal characteristic line A. Accordingly, the controller 7 makes the calculating means 7a calculate the voltage level and subsequently makes the recording unit 7b record the voltage level as a reference voltage level. When the controller 7 starts the rough seek operation, the calculating means 7a calculates the voltage level based on the reference voltage level which is recorded by the recording unit 7b. In FIG. 2, the characteristic of the drive time and the number of passed tracks is indicated by a corrected characteristic line C when the motor 6 drives at the voltage level which is calculated on the basis of the reference voltage level.

The corrected characteristic line C intersects with the ideal characteristic line A, and when the drive time of the motor gets longer, the number of passed tracks of the corrected characteristic line C may be larger than that of the ideal characteristic line A.

Accordingly, the calculating means 7a calculates a curve D by subtracting the corrected number of tracks which is recorded by the recording unit 7b from the actual characteristic B and subsequently calculates the voltage level for the curve D as a reference voltage level. The calculating means 7a makes the recording unit 7b record the voltage level which is calculated on the basis of the curve D as a reference voltage. When calculating the voltage level next time, the calculating means 7a calculates the voltage level by using the reference voltage level which is recorded by the recording unit 7b. A processing which is performed by the calculating means 7a by calculating the voltage level with using the reference voltage level which is recorded by the recording unit 7b is referred to as a learning processing. In this manner, the calculating means 7a can calculate the voltage level in view of the load resulting from the motor 6 driving and the load resulting from the optical pickup 4 moving which are different for each disc apparatus 1 by performing the learning processing.

In FIG. 2, when the motor 6 drives at the voltage level which is calculated by the calculated means 7a with the learning processing, a characteristic of the drive time and the number of passed tracks is indicated by a learning processing characteristic line E. At this time, a slope of the learning processing characteristic line E is substantially the same as that of the ideal characteristic line A when the number of passed tracks increases to reach more than 2000. The controller 7 can move the optical pickup 4 swiftly by driving the motor 6 at the voltage level which has a slope of the learning processing characteristic line E even when there are the load resulting from the motor 6 driving and the load resulting from the optical pickup 4 moving.

Figure 3A:
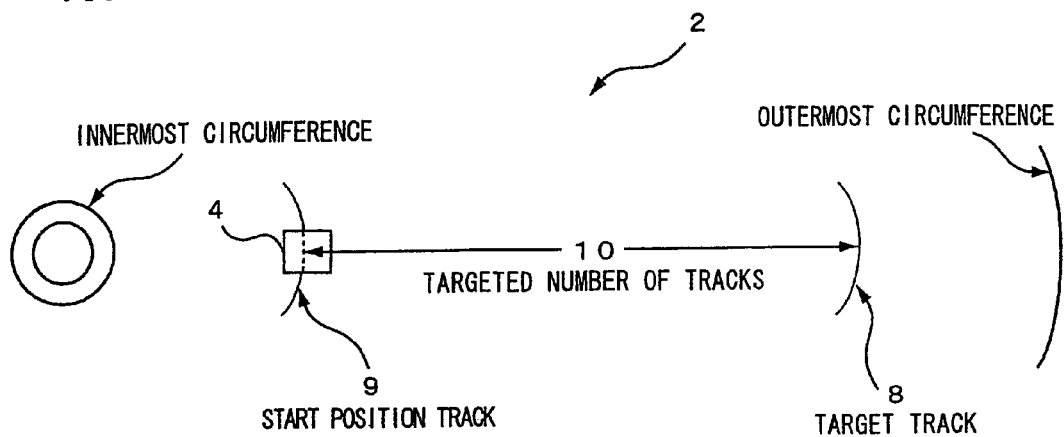
FIGS. 3A and 3B are diagrams showing a rough seek operation of the optical pickup according to the first and second embodiments of the present invention.
Figure 3B:
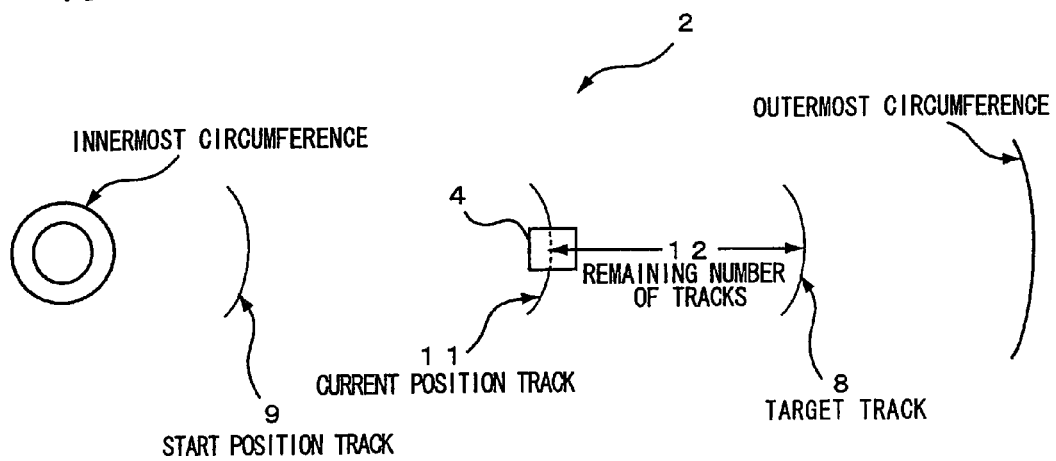

FIGS. 3A and 3B show the rough seek operation of the optical pickup 4 according to the first and second preferred embodiments of the present invention. FIG. 3A shows the rough seek operation started, and FIG. 3B shows a state during the rough seek operation is performed. In FIGS. 3A and 3B, the optical pickup 4 moves over the optical disc 2 from a side of an innermost circumference toward a side of an outermost circumference, and a track which is a target for the controller 7 to move the optical pickup 4 is referred to as a target track 8. In FIG. 3A, the signal detecting unit 5 detects a track which the optical pickup 4 is positioned at the start of the rough seek operation as a start position track 9 and sends data of the start position track 9 to the controller 7.

The calculating means 7a calculates a targeted number of tracks 10 which should be passed by the optical pickup 4 from the target track 8 and the start position track 9. When the targeted number of tracks 10 is equal to or larger than the predetermined threshold level, the calculating means 7a calculates the voltage level which is applied to the motor 6 based on the predetermined coefficient and the targeted number of tracks 10. In the present preferred embodiment, the predetermined threshold level is set to 2000, for example, for the reason that the actual characteristic line B changes from the curve to the straight line when the number of passed tracks reaches 2000 in FIG. 2. When the targeted number of tracks 10 is smaller than 2000, the relationship between the drive time of the motor 6 and the number of passed tracks which the optical pickup moves over is not similar to the ideal characteristic line A in FIG. 2 even when the motor drives at the voltage level which is calculated by the calculating means 7a. Consequently, the threshold level is set to 2000, and when the targeted number of tracks 10 is 2000 or more, the controller 7 can move the optical pickup 4 swiftly by performing the rough seek operation.

FIG. 3B shows the state during the rough seek operation is performed after the optical pickup 4 is moved by the motor 6. Even when the controller 7 drives the motor 6 at the voltage level which is calculated by the calculating means 7a, it is not generally possible to move the optical pickup 4 to the target track 8 with one rough seek operation. In the present preferred embodiment, tracks where the optical pickup 4 is positioned after moved by the motor 6 are referred to as a current position track 11. The controller 7 makes the calculating means 7a calculate the voltage level again to move the optical pickup 4 to the target track 8 and subsequently drives the motor 6 at the voltage level which is calculated again. The calculating means 7a calculates the number of tracks which the optical pickup 4 should further move over to reach the target track 8 from the current position track 11 as a remaining number of tracks 12.

The calculating means 7a calculates the voltage level which is applied to the motor 6 based on the predetermined coefficient, the targeted number of tracks 10, and the remaining number of tracks 12. The controller 7 moves the optical pickup 4 by driving the motor 6 at the voltage level which is calculated by the calculating means 7a. At that time, the controller 7 performs the rough seek operation repeatedly until the remaining number of tracks 12 becomes smaller than the threshold level. When the remaining number of tracks 12 becomes smaller than the threshold level, the controller 7 moves the optical pickup 4 to the target track 8 by performing the precise seek operation.

Next, the rough seek operation according to the first preferred embodiment is described below. The calculating means 7a calculates a voltage adjusted level by using the following formula:

Voltage adjusted level=((remaining number of tracks 12−corrected number of tracks)×coefficient)/ targeted number of tracks 10    (1)

In the present preferred embodiment, the corrected number of tracks and the coefficient are previously recorded by the recording unit 7b, and the corrected number of tracks is 1000, for example, and the coefficient is 50, for example. Moreover, the calculating means 7a calculates a sum of the reference voltage level which is previously recorded and the voltage adjusted level as the voltage level. In the present preferred embodiment, the reference voltage level is 2V, for example. The corrected number of tracks, the coefficient, and the reference voltage level are set to allow the actual characteristic line B to be the learning processing characteristic line E.

Figure 4A:
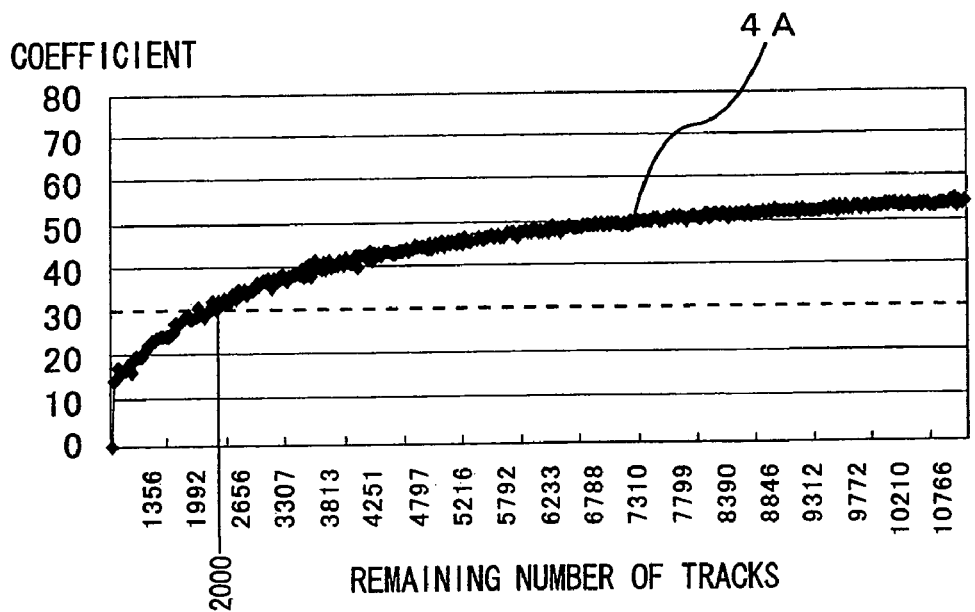
FIGS. 4A and 4B are diagrams showing a relationship between a remaining number of tracks and a coefficient according to the first preferred embodiment.
Figure 4B:
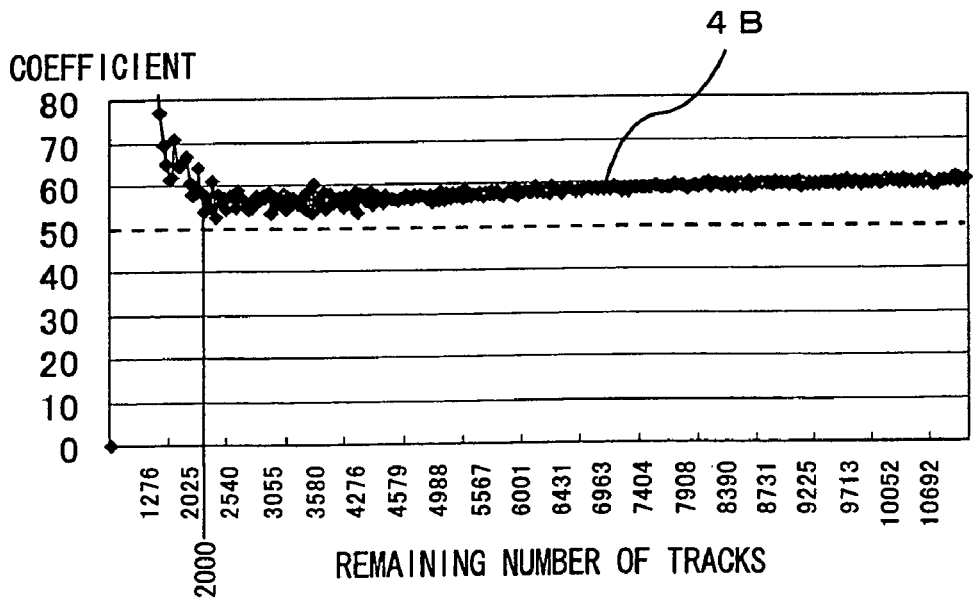

FIGS. 4A and 4B show the relationship between the remaining number of tracks 12 and the coefficient according to the first preferred embodiment. FIG. 4A shows the relationship between the remaining number of tracks 12 and the coefficient when the calculating means 7a calculates the voltage adjusted level by using the following formula:

Voltage adjusted level=(remaining number of tracks 12×coefficient)/targeted number of tracks 10    (2).

FIG. 4B shows the relationship between the remaining number of tracks 12 and the coefficient when the calculating means 7a calculates the voltage adjusted level by using the formula (1). In FIGS. 4A and 4B, a horizontal axis indicates the remaining number of tracks 12. A vertical axis in FIG. 4A indicates the coefficient in accordance with the respective remaining number of tracks 12 of the corrected characteristic line C in FIG. 2. A vertical axis in FIG. 4B indicates the coefficient in accordance with the respective remaining number of tracks 12 of the learning processing characteristic line E in FIG. 2. Moreover, a curve in FIG. 4A is referred to as a coefficient curve 4A and a curve in FIG. 4B is referred to as a coefficient curve 4B. The recording unit 7b records a largest coefficient which has the remaining number of tracks 12 reaching 2000 or more and which is not larger than the coefficients of the coefficient curve 4A or the coefficient curve 4B in FIG. 4A or FIG. 4B.

In FIG. 4A, the coefficient which is recorded by the recording unit 7b is 30, for example. However, as the remaining number of tracks 12 gets larger, there is a great difference between the coefficient 30 and the coefficient curve 4A. This shows that particularly when the remaining number of tracks 12 is large, the controller 7 cannot move the optical pickup 4 to the position close to the target track 8 even when the controller 7 drives the motor 6 at the voltage level which the calculating means 7a calculates with setting the coefficient to 30. In contrast, in FIG. 4B, the coefficient which is recorded by the recording unit 7b is 50, for example. Even as the remaining number of tracks 12 gets larger, there is not a great difference between the coefficient 50 and the coefficient curve 4B. Consequently, the controller 7 can move the optical pickup 4 to the position close to the target track 8 by driving the motor 6 at the voltage level which the calculating means 7a calculates with setting the coefficient to 50.

Figure 5:
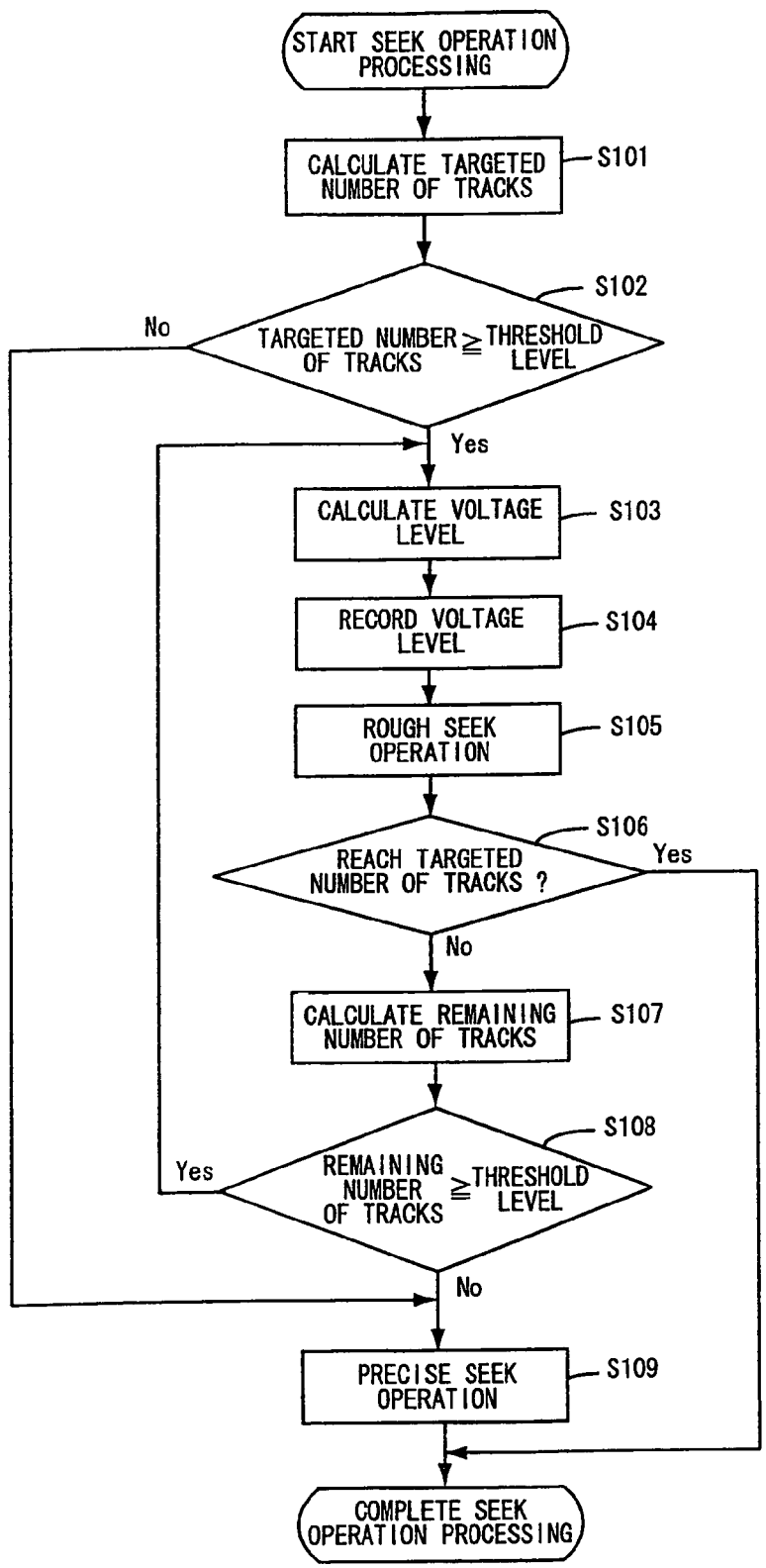
FIG. 5 is a flow chart of a seek operation processing according to the first preferred embodiment of the present invention.

Next, the seek operation processing according to the first preferred embodiment is described below. FIG. 5 shows the flow chart of the seek operation processing according to the present preferred embodiment. When the optical pickup 4 records and reproduces the data on/from the optical disk 2, the controller 7 starts the seek operation processing to move the optical pickup 4 to the target track 8. When the seek operation processing is started, the calculating means 7a calculates the targeted number of tracks 10 from the track signals which are detected by the signal detecting unit 5 and the target track 8 (S101). Next, the calculating means 7a compares the targeted number of tracks 10 and the threshold level which is recorded by the recording unit 7b (S102). When the targeted number of tracks 10 is smaller than the threshold level (No in S102), the controller 7 performs the precise seek operation for the reason that the time for the seek operation cannot be reduced even when the controller 7 moves the optical pickup 4 with the rough seek operation (S109).

In the step S102, when the targeted number of tracks 10 is equal to or larger than the threshold level (Yes in S102), the calculating means 7a calculates the voltage adjusted level by using the formula (1), and subsequently calculates a sum of the voltage adjusted level and the reference voltage level which is recorded by the recording unit 7b as the voltage level (S103). The calculating means 7a makes the recording unit 7b record the voltage level as the reference voltage level (S104). The controller 7 moves the optical pickup 4 with the rough seek operation to drive the motor 6 at the voltage level calculated by the calculating means 7a (S105).

When the optical pickup 4 moves, the controller 7 judges whether the optical pickup 4 reaches the target track 8 or not by the track signals which are detected by the signal detecting unit 5 (S106). In the step S106, when the optical pickup 4 reaches the target track 8 (Yes in S106), the controller 7 completes the seek operation processing. In contrast, in the step S106, when the optical pickup 4 does not reach the target track 8 (No in S106), the calculating means 7a calculates the remaining number of tracks 12 from the track signals which are detected by the signal detecting unit 5 (S107).

Next, the calculating means 7a compares the remaining number of tracks 12 and the threshold level (S108). When the remaining number of tracks 12 is equal to or larger than the threshold level (Yes in S108), the controller 7 makes the calculating means 7a calculate the voltage level (S103) so that the controller 7 performs the rough seek operation again (S105). In contrast, in the step S108, when the remaining number of tracks 12 is smaller than the threshold level (No in S108), the controller 7 performs the precise seek operation to make the optical pickup 4 reach the target track 8 accurately (S109). When the optical pickup 4 reach the target track 8, the controller 7 completes the seek operation processing.

Figure 6A:
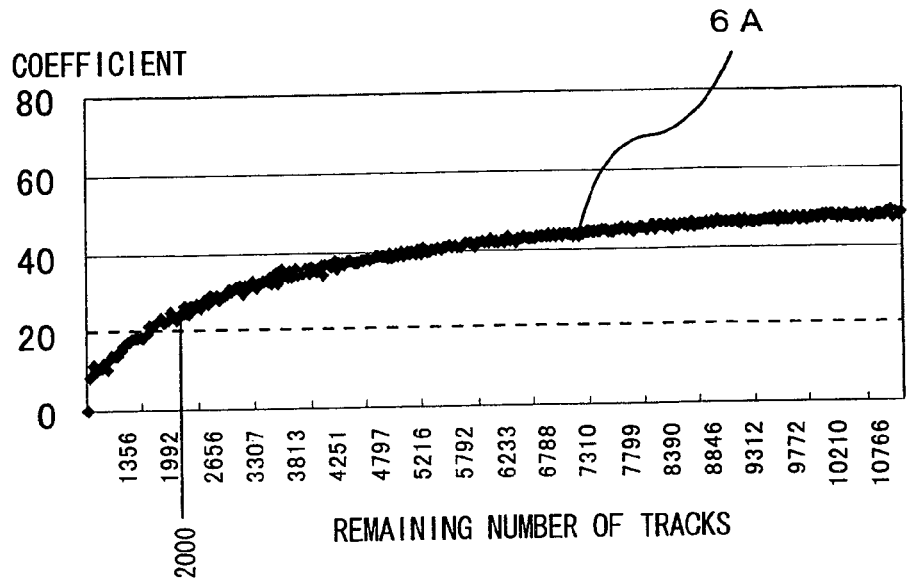
FIGS. 6A and 6B are diagrams showing a relationship between a remaining number of tracks and a coefficient according to the second preferred embodiment.
Figure 6B:
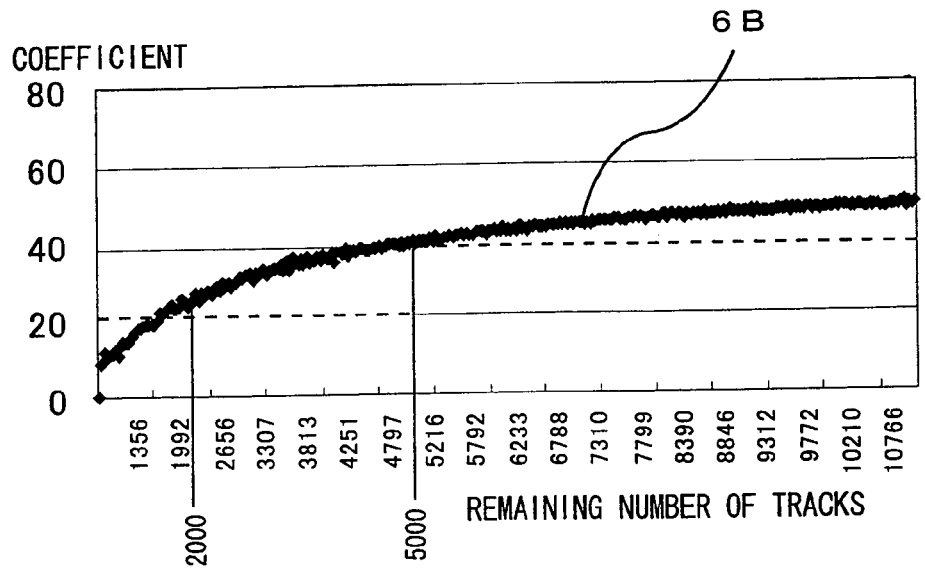

Next, the rough seek operation according to the second preferred embodiment of the present invention is described below. In the present preferred embodiment, the calculating means 7a calculates the voltage level in accordance with the voltage adjusted level which is calculated by using the formula (2). FIGS. 6A and 6B show the relationship between the remaining number of tracks 12 and the coefficient according to the second preferred embodiment. In FIGS. 6A and 6B, a horizontal axis indicates the remaining number of tracks 12 and a vertical axis indicates the coefficient in accordance with the respective remaining number of tracks 12 of the corrected characteristic line C in FIG. 2. Moreover, a curve in FIG. 6A is referred to as a coefficient curve 6A and a curve in FIG. 6B is referred to as a coefficient curve 6B.

In FIG. 6A, the coefficient which is recorded by the recording unit 7b is 20, for example. However, as the remaining number of tracks 12 gets larger, there is a great difference between the coefficient 20 and the coefficient curve 6A. This shows that the controller 7 cannot move the optical pickup 4 to the position close to the target track 8 even when the controller 7 drives the motor 6 at the voltage level which the calculating means 7a calculates with setting the coefficient to 20. Consequently, the recording unit 7b according to the present preferred embodiment records two coefficients which are used when the calculating means 7a calculates the voltage level in accordance with the remaining number of tracks 12. Moreover, the recording unit 7b records the predetermined level in relation to the remaining number of tracks 12.

In FIG. 6B, when the remaining number of tracks 12 is 2000 or more and smaller than 5000 and also when the coefficient is 20, there is not a great difference between the coefficient 20 and the coefficient curve 6B. Moreover, when the remaining number of tracks 12 is 5000 or more and also when the coefficient is 40, there is not a great difference between the coefficient 40 and the coefficient curve 6B. Consequently, the recording unit 7b records the two coefficients 20 and 40, for example, in view of the relationship between the remaining number of tracks 12 and the coefficient, and also records 500 as the predetermined level, for example. When the remaining number of tracks 12 is 2000 or more and smaller than 5000, which is the predetermined level, the calculating means 7a calculates the voltage level with using the coefficient 20. Moreover, when the remaining number of tracks 12 is 5000 or more, the calculating means 7a calculates the voltage level with using the coefficient 40. Consequently, the controller 7 can move the optical pickup 4 to the position close to the target track 8 by driving the motor 6 at the voltage level which the calculating means 7a calculates.

Figure 7:
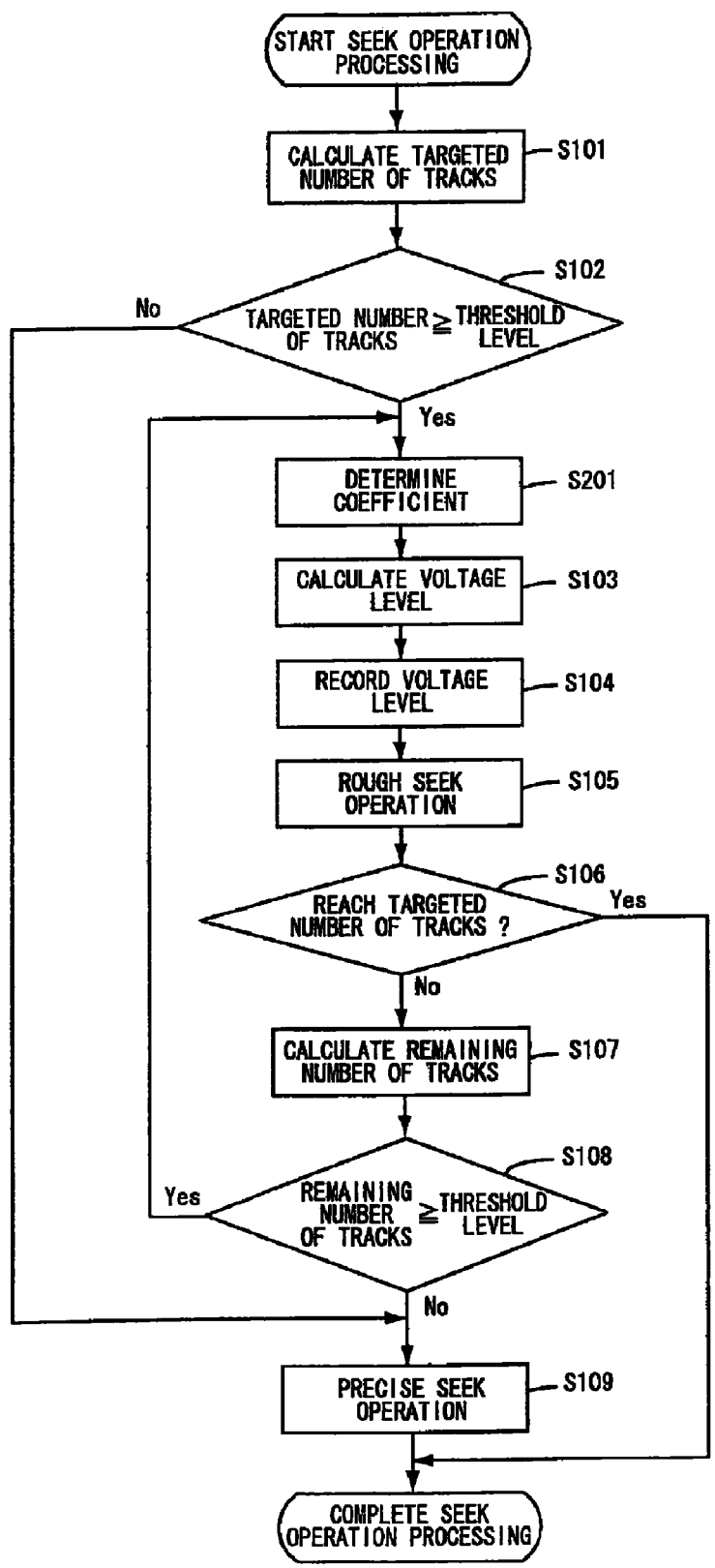
FIG. 7 is a flow chart of a seek operation processing according to the second preferred embodiment of the present invention.

Next, the seek operation processing according to the second preferred embodiment is described below. FIG. 7 shows the flow chart of the seek operation processing according to the present preferred embodiment. In FIG. 7, the seek operation processing according to the present preferred embodiment is different from the seek operation processing in FIG. 5 only in the processing in the step S201. The processing in the step S201 is described below. In FIG. 7, the processing in the step S201 is performed between the processing in the step S1102 and the processing in the step S103. When the targeted number of tracks 10 is equal to or larger than the threshold level in the step S102 (Yes in S102), the calculating means 7a determines the coefficient based on whether the targeted number of tracks 10 is larger than the predetermined level which is recorded by the recording unit 7b or not (S201). For example, in the step S201, when the targeted number of tracks 10 is smaller than 5000, the calculating means 7a determines the coefficient to be 20, and when the targeted number of tracks 10 is 5000 or more, the calculating means 7a determines the coefficient to be 40. Next, the calculating means 7a calculates the voltage level with using the coefficient which is determined in the step S201 (S103). Consequently, the controller 7 can move the optical pickup 4 to the position close to the target track 8 by the tough seek operation.

In this manner, in the first preferred embodiment described above, the calculating means 7a calculates the value obtained by multiplying the difference between the remaining number of tracks 12 and the predetermined corrected number of tracks by the coefficient and subsequently dividing by the targeted number of tracks 10 as the voltage adjusted level. Moreover, the calculating means 7a calculates the sum of the voltage adjusted level and the reference voltage level which is recorded by the recording unit 7b as the voltage level. In the second preferred embodiment, the calculating means 7a determines the coefficient which is used to calculate the voltage level in accordance with the targeted number of tracks 10. The controller 7 performs the rough seek operation to drive the motor 6 at the voltage level calculated by the calculating means 7a. Consequently, the disc apparatus 1 enables the optical pickup 4 to move to the position close to the target track 8 by the rough seek operation, so that it is possible to complete the seek operation processing in a short time compared to the case that the optical pickup 4 is moved to the target track 8 only by the precise seek operation.

The present invention is not limited to the configuration of the above preferred embodiment, however, various modification are applicable, and for example, the recording unit 7b may have a configuration to record the predetermined threshold level not as 2000 but as the level smaller than 2000 in the first preferred embodiment. Moreover, the recording unit 7b may have a configuration to record not the two coefficients but more than one coefficient.

What is claimed is:

1. A disc apparatus, comprising:
    an optical pickup which irradiates an optical disc with a laser light to record and reproduce data;
    a motor which moves the optical pickup in a radial direction of the optical disc in accordance with an applied voltage level; and
    a controller which controls the optical pickup and the motor, wherein
    the controller further includes a recording unit which records a predetermined reference voltage level and a coefficient and a calculating means which calculates a voltage level so that a seek operation is performed by driving the motor to move the optical pick up to a target track or a position close to the target track, and
    when a targeted number of tracks between a start position track which the optical pickup is positioned over at start of the seek operation and the target track is equal to or larger than a predetermined threshold level, the calculating means calculates a voltage adjusted level based on a remaining number of tracks between a current position track which the optical pickup is positioned over and the target track, the coefficient, and the targeted number of tracks, calculates the voltage level based on the voltage adjusted level and the reference voltage level; and makes the recording unit record the voltage level as the reference voltage level,
    the motor moves the optical pickup in accordance with the voltage level, and
    the controller performs the seek operation repeatedly until the remaining number of tracks becomes smaller than the predetermined threshold level.

2. The disc apparatus according to claim 1, wherein
    the recording unit records the predetermined level corresponding to the remaining number of tracks and at least two coefficients, and
    the calculating means determines one coefficient from the coefficients which are recorded by the recording unit depending on whether the remaining number of tracks is larger than the predetermined level or not, and calculates a value obtained by multiplying the remaining number of tracks by the coefficient and subsequently dividing by the targeted number of tracks as the voltage adjusted level.

3. The disc apparatus according to claim 1, wherein
    the recording unit records a predetermined corrected number of tracks, and
    the calculating means calculates a voltage adjusted level obtained by multiplying a difference between the remaining number of tracks and the corrected number of tracks by the coefficient and subsequently dividing by the targeted number of tracks, and subsequently calculates a sum of the voltage adjusted level and the reference voltage level as the voltage level.

* * * * *